US010241291B2

(12) United States Patent
Kamo et al.

(10) Patent No.: US 10,241,291 B2
(45) Date of Patent: Mar. 26, 2019

(54) LENS BARREL, AND LENS APPARATUS AND IMAGE PICKUP APPARATUS INCLUDING SAME (71) Applicant: CANON KABUSHIKI KAISHA, Tokyo (JP)

(72) Inventors: Daichi Kamo, Saitama (JP); Kentaro Takano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/453,303

(22) Filed: Mar. 8, 2017

(65) Prior Publication Data
US 2017/0276896 A1    Sep. 28, 2017

(30) Foreign Application Priority Data

Mar. 22, 2016    (JP) .................................. 2016-057164

(51) Int. Cl.
*G02B 7/02*    (2006.01)
*G02B 7/10*    (2006.01)

(52) U.S. Cl.
CPC .............. *G02B 7/023* (2013.01); *G02B 7/021* (2013.01); *G02B 7/10* (2013.01)

(58) Field of Classification Search
CPC ................................ G02B 7/023; G02B 7/021
See application file for complete search history.

(56) References Cited

U.S. PATENT DOCUMENTS 7,019,913 B1    3/2006    Wang
7,871,204 B2    1/2011    Nuno

FOREIGN PATENT DOCUMENTS

| CN | 202305967 U | 7/2012 |
| JP | H11167066 A | 6/1999 |
| JP | 2004341451 A | 12/2004 |
| JP | 2007033957 A | 2/2007 |
| JP | 2008224795 A | 9/2008 |
| JP | 2009244585 A | 10/2009 |
| JP | 2010145432 A | 7/2010 |

(Continued)

OTHER PUBLICATIONS

Office Action issued in Japanese Appln. No. 2016-057164 dated Apr. 26, 2018.

(Continued)

*Primary Examiner* — Jack Dinh
(74) *Attorney, Agent, or Firm* — Rossi, Kimms & McDowell LLP (57) ABSTRACT A lens barrel includes: fixed barrel including straight groove extending in optical axis direction; cam ring rotatable around optical axis relative to the fixed barrel, and provided with first and second cam grooves; first barrel to which sub-barrel to hold first optic is detachably fixed, the first barrel including first cam follower slidably contacting with the straight groove and the first cam groove; second barrel holding second optic, and including second cam follower slidably contacting with the straight groove and the second cam groove; elastic member disposed between the first and second barrels when sub-barrel is fixed to the first barrel, and biasing the first and second barrels oppositely in the optical axis direction; and regulating mechanism regulating position of end of the elastic member relative to the first barrel without fixing the elastic member to the sub-barrel when the sub-barrel is fixed to the first barrel.

12 Claims, 11 Drawing Sheets

(56) References Cited

FOREIGN PATENT DOCUMENTS

| | | |
|---|---|---|
| JP | 2011027817 A | 2/2011 |
| JP | 2012048159 A | 3/2012 |
| JP | 2013080080 A | 5/2013 |
| JP | 2015158629 A | 9/2015 |

OTHER PUBLICATIONS

Office Action issued in Japanese Appln. No. 2016-057164 dated Apr. 26, 2018. English translation provided.
Office Action issued in Japanese Application No. 2016-057164 dated Dec. 4, 2018.

LENS BARREL, AND LENS APPARATUS AND IMAGE PICKUP APPARATUS INCLUDING SAME

BACKGROUND OF THE INVENTION

Field of the Invention

The present invention relates to a lens barrel in a lens apparatus, or more specifically, to a lens barrel including a lens barrel submodule to be moved in a direction of an optical axis by a cam mechanism, and to a lens apparatus and an image pickup apparatus including the lens barrel.

Description of the Related Art

In the field of a mechanism configured to move optical systems in directions of an optical axis by use of cams and cam followers, a structure configured to move each cam follower to one side of a groove by inserting an elastic member into a space between moving optical systems has been proposed as a structure to suppress backlash between the cams and the cam followers. Japanese Patent Application Laid-Open No. 2009-244585 describes a structure configured to suppress backlash by inserting a coil spring into each space between moving-part groups so as to bias the moving-part groups in mutually opposite directions.

However, according to the related art disclosed in Japanese Patent Application Laid-Open No. 2009-244585, an end face of such a coil spring is prone to come off the corresponding moving-part group, and the coil spring may intrude into an optical path as a consequence. In this regard, it is a general practice to bond the coil spring to the moving-part group so as to prevent the end face of the coil spring from coming off the moving-part group and intruding into the optical path. Here, each moving-part group includes a moving lens barrel supported by the cam through the cam follower, and a lens barrel unit attached to the moving lens barrel and configured to hold a lens. The coil spring is bonded to the moving lens barrel or the lens barrel unit (note that the moving lens barrel and the lens barrel unit are in together according to Japanese Patent. Application Laid-Open No. 2009-244585).

Nonetheless, when the coil spring is directly bonded to the moving lens barrel, the cam follower is fitted while biasing the moving lens barrel with the spring. Accordingly, this configuration has a problem of a difficulty in attaching the cam follower because the moving lens barrel is apt to be moved by a force of the spring. On the other hand, the configuration in which the coil spring is directly bonded to the lens barrel unit that holds the lens causes a problem of reduction in workability for attachment and detachment of the lens barrel unit during maintenance.

SUMMARY OF THE INVENTION

To solve the above problems, a lens barrel includes: a fixed barrel including a straight groove extending in a direction of an optical axis; a cam ring being rotatable around the optical axis relative to the fixed barrel, and provided with a first cam groove and a second cam groove; a first moving lens barrel to which a lens barrel submodule to hold a first optical element is detachably fixed, the first moving lens barrel including a first cam follower configured to come into slidable contact with the straight groove and the first cam groove; a second moving lens barrel holding a second optical element, and including a second cam follower configured to come into slidable contact with the straight groove and the second cam groove; an elastic member disposed between the first moving lens barrel and the second moving lens barrel in a state where the lens barrel submodule is fixed to the first moving lens barrel, and configured to bias the first moving lens barrel and the second moving lens barrel in mutually opposite directions along the direction of the optical axis; and an edge regulating mechanism configured, in the state where the lens barrel submodule is fixed to the first moving lens barrel, to regulate a position of an end of the elastic member relative to the first moving lens barrel without fixing the elastic member to the lens barrel submodule.

The present invention provides a lens barrel for a lens apparatus, which has a structure to establish both prevention of a coil spring therein from coming off a moving-part group and improvement in workability during maintenance, and is configured to achieve suppression of backlash between a cam and a cam follower. The present invention also provides a lens apparatus and an image pickup apparatus including the lens barrel.

DESCRIPTION OF THE EMBODIMENTS

Embodiments of the present invention will be described below with reference to the accompanying drawings.

First Embodiment

Figure 1:
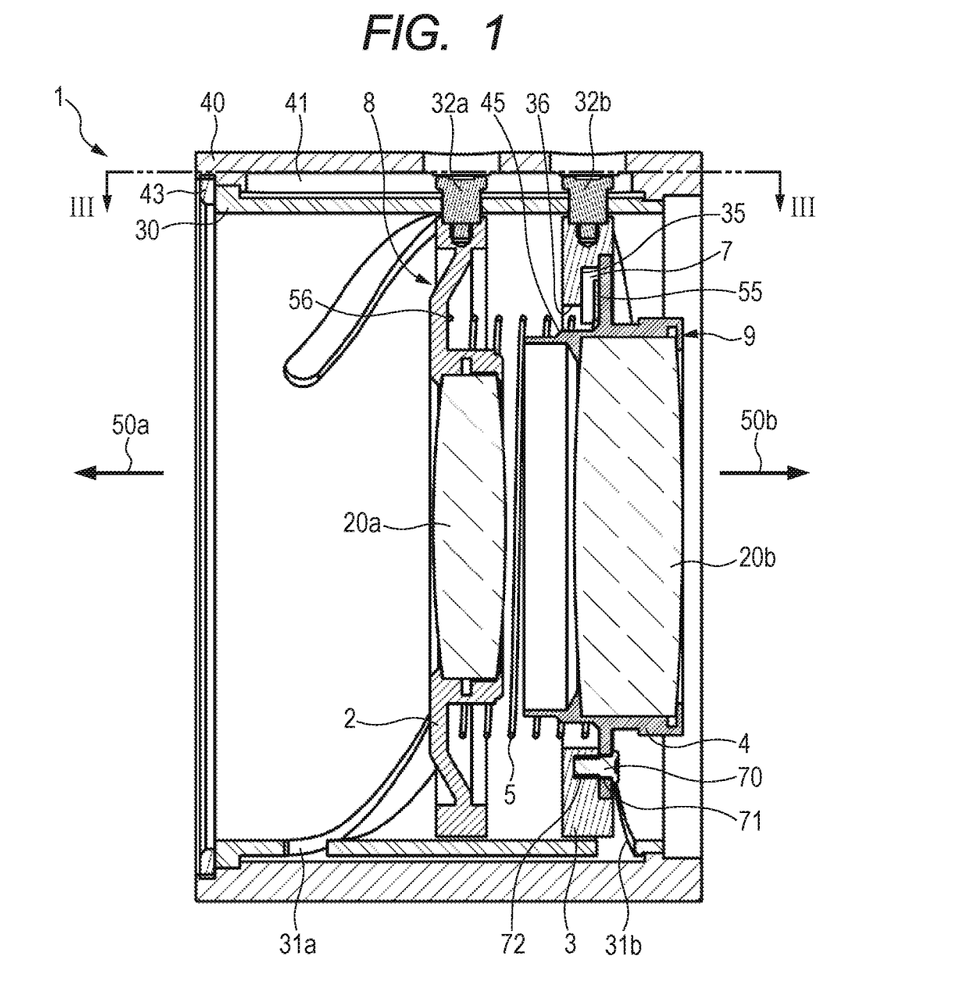
FIG. 1 is a partial cross-sectional view of a lens barrel of a first embodiment.
Figure 2:
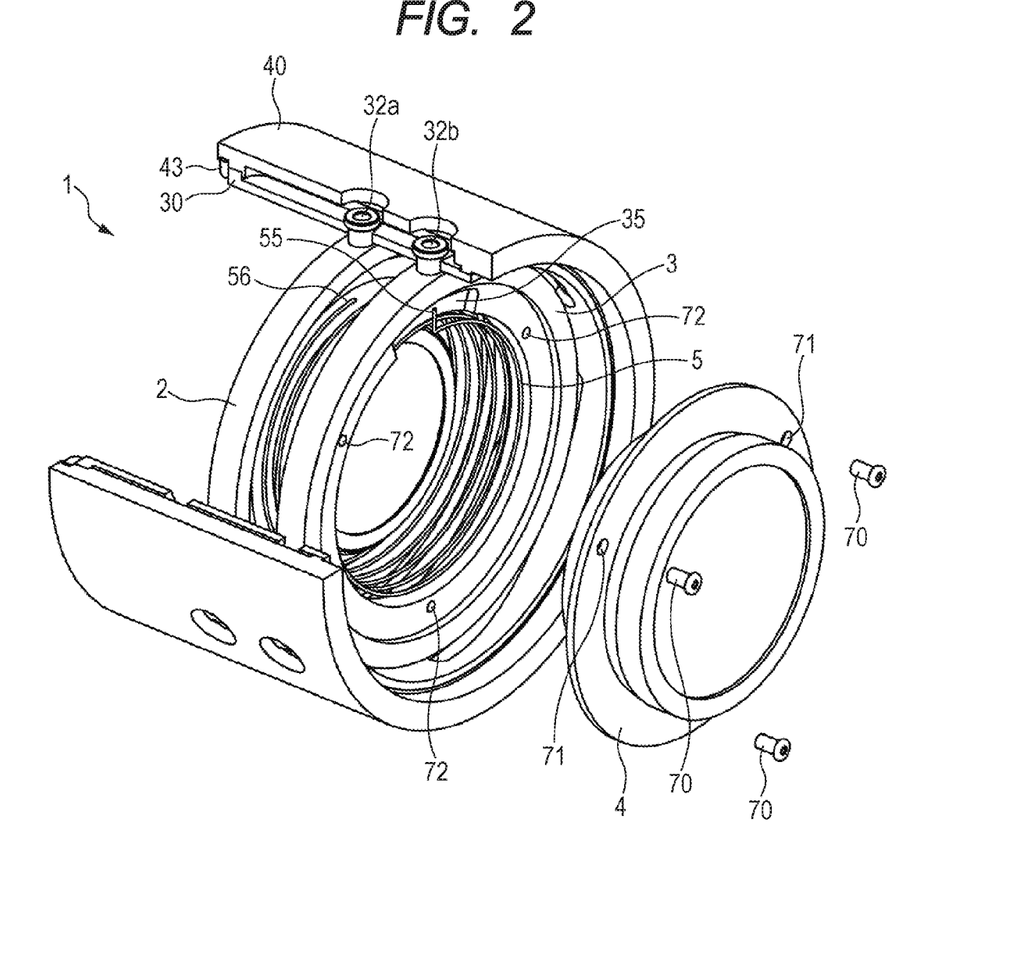
FIG. 2 is a partially cutaway perspective view of the lens barrel of the first embodiment.
Figure 3:
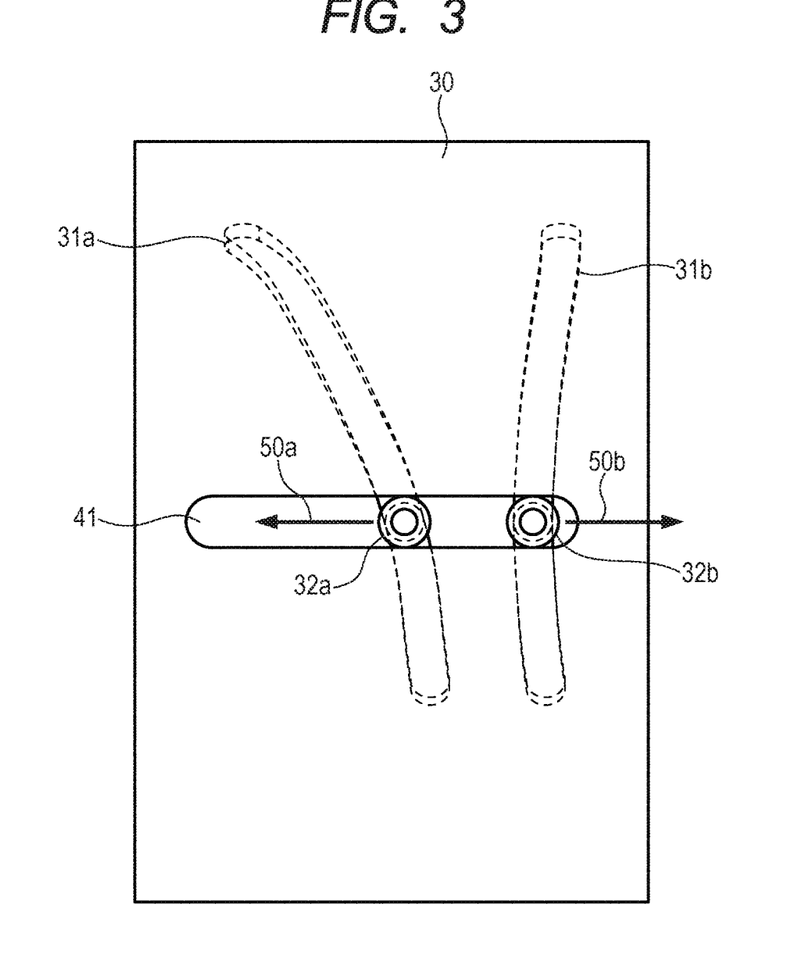
FIG. 3 is a cross-sectional view of the lens barrel of the first embodiment, which is taken along the III-III line in FIG. 1.

FIG. 1 is a partial cross-sectional view of a lens barrel 1 of this embodiment. FIG. 2 shows a partially cutaway perspective view of the lens barrel 1 in FIG. 1, and FIG. 3 shows a cross-sectional view of the lens barrel 1 taken along the III-III line in FIG. 1.

A cam structure of the lens barrel 1 will be described with reference to FIG. 1. The lens barrel 1 includes a lens barrel submodule, optical systems, and a drive system which drives some of the optical systems. The drive system of this embodiment employs a so-called cam mechanism in order to move the optical systems (optical elements) such as lenses and diaphragms in directions of an optical axis, and thus to adjust an optical performance of the lens barrel 1. A front moving-part group 8 has a configuration in which a front optical system 20a is fixed to a front moving ring 2 with a lens holding structure obtained by using a press ring or by calking. A rear optical system 20b is fixed to a rear lens barrel submodule 4 (the lens barrel submodule) with a similar lens holding structure. Moreover, the rear lens barrel submodule 4 includes a screw insertion hole 71 into which a fixation screw 70 is inserted. A rear moving-part group 9 has a configuration in which the rear lens barrel submodule 4 is detachably fixed to a rear moving ring 3 (a moving lens barrel) by threadedly engaging the fixation screw 10 with a tapped hole 72 in the rear moving ring 3. A cam follower (a second cam follower) 32a is fixed to the front moving ring (a second moving lens barrel) 2, and another cam follower (a first cam follower) 32b is fixed to the rear moving ring (a first moving lens barrel) The cam follower 32a comes into slidable contact with a cam groove 31a provided on a rotating cam ring 30 and with a straight groove portion 41 located on a base ring (a fixed barrel) 40 and extending in the direction of the optical axis. The cam follower 32b comes into slidable contact with a cam groove 31b provided on the cam ring 30, and with the straight groove portion 41 located on the base ring 40. Here, attitudes of the front moving ring 2 and the rear moving ring 3 are retained by locating the cam followers 32a and 32b, the cam grooves 31a and 31b, and the straight groove portion 41 at three positions that are substantially equally divided around the optical axis. The cam ring 30 is held at an inside diameter portion of the base ring 40 and in a state of being rotatable around the optical axis by using a cam press member 43. When the cam ring 30 is rotated, the cam followers 32a and 32b are moved in directions 50a and 50b of the optical axis along the cam grooves 31a and 31b. As a consequence, an optical performance of the lens barrel 1 varies with a change in interval between the front optical system 20a and the rear optical system 20b.

While there is backlash between the cam follower 32a or 32h and the corresponding cam groove 31a or 31b, which depends on part accuracy, this backlash needs to be suppressed in order to reduce an adverse effect on the optical performance. Now, a backlash suppression structure for the cam followers will be described below with reference to FIGS. 1 to 6.

The lens barrel 1 includes a coil spring 5 being an elastic member, which is located between the front moving ring 2 and the rear lens barrel submodule 4. The coil spring 5 generates a spring force between the front moving ring 2 and the rear lens barrel submodule 4. The force acts on the front moving ring 2 and the rear lens barrel submodule 4 as a force to bias the front moving ring 2 and the rear lens barrel submodule 4 in mutually opposite directions (receding directions) along the direction of the optical axis. The force acting on the front moving ring 2 and the rear lens barrel submodule 4 acts in a direction 50a of the optical axis on the cam follower 32a and in a direction 50b of the optical axis on the cam follower 32b, thereby suppressing the backlash with the cam grooves 31a and 31b.

Figure 4:
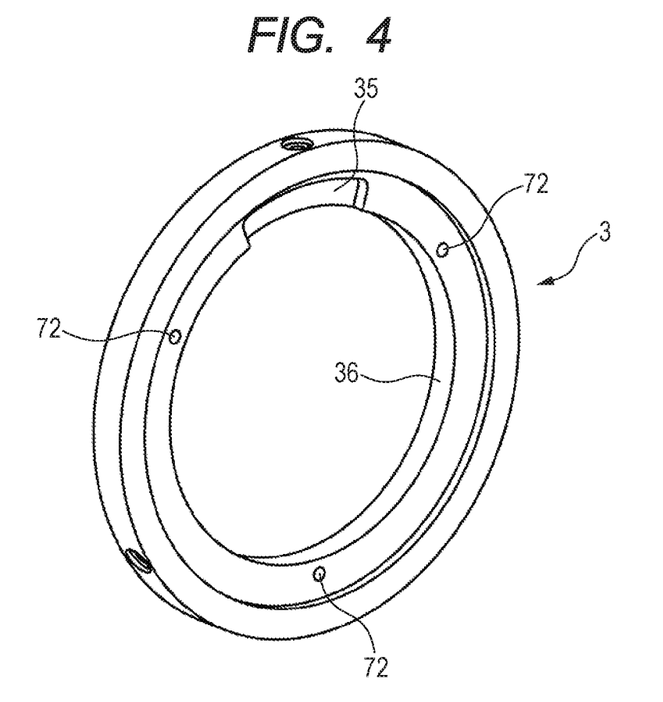
FIG. 4 is a view from the right side of a rear moving ring of the first embodiment.
Figure 5:
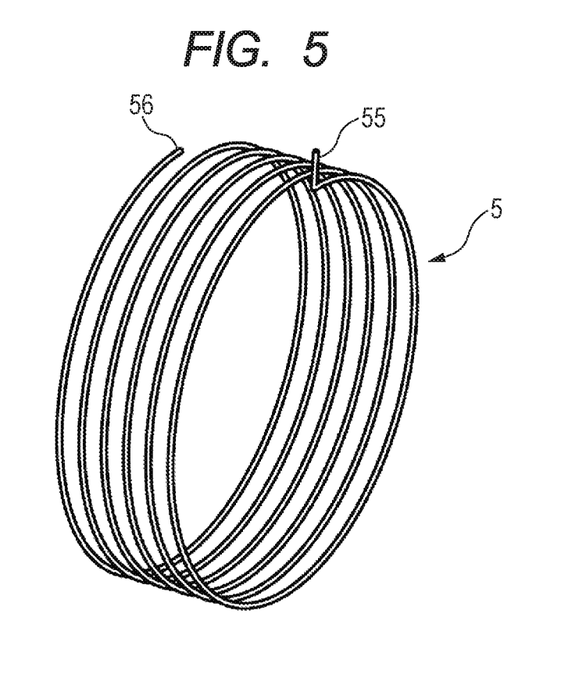
FIG. 5 is a view from the right side of a coil spring of the first embodiment.
Figure 6:
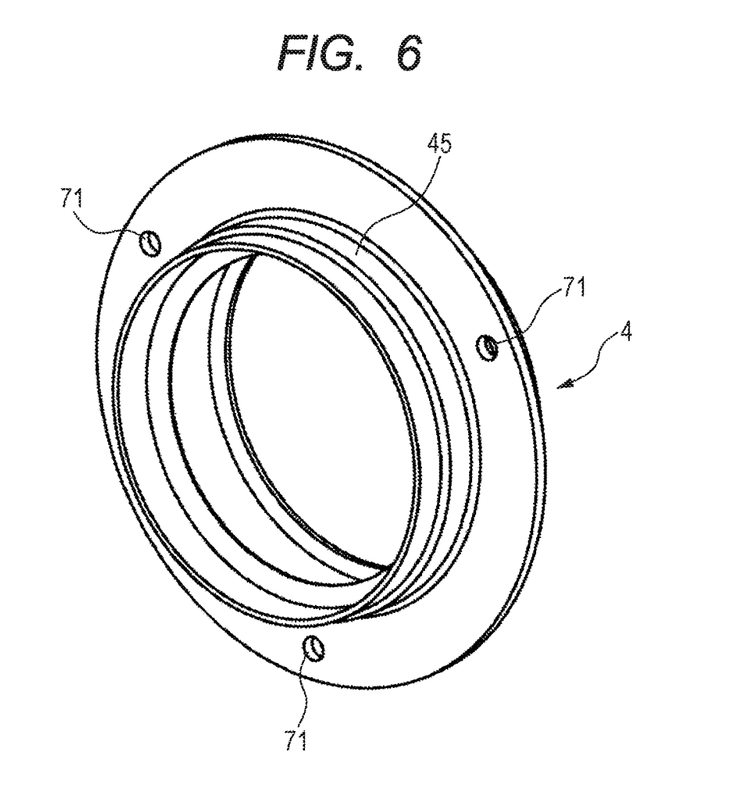
FIG. 6 is a view from the left side of a rear lens barrel submodule of the first embodiment.

FIG. 4 shows a view from the right side of the rear moving ring 3. FIG. 5 shows a view from the right side of the coil spring 5. FIG. 6 shows a view from the left side of the rear lens barrel submodule 4. The coil spring 5 includes a bent portion 55, which is formed by bending an end of the coil spring 5 into a radial direction. Meanwhile, the rear moving ring 3 includes a recess 35 provided at part of a attach surface to be attached to the rear lens barrel submodule 4. When the rear lens barrel submodule 4 is attached to the rear moving ring 3, at least part of the bent portion 55 of the coil spring 5 is housed in a clearance extending in the direction of the optical axis and being defined between the recess 35 and a attach surface of the rear lens barrel submodule 4. In this embodiment, the bent portion 55 of the coil spring 5, the recess 35 formed at, part of the attach surface of the rear moving ring 3 to be attached to the rear lens barrel submodule 4, and part of the attach surface of the rear lens barrel submodule 4 to be attached to the rear moving ring 3 collectively constitute an edge regulating mechanism that regulates a position of the end of the coil spring 5

FIG. 2 shows a state before fixing the rear lens barrel submodule 4 to the rear moving ring 3. An end 56 on the front moving ring 2 side of the coil spring 5 is bonded to the front moving ring 2. When the rear lens barrel submodule 4 is fixed to the rear moving ring 3 as shown in FIGS. 1 and 2, the bent portion 55 of the coil spring 5 is housed in a spring housing 7 formed by the rear lens barrel submodule 4 and the recess 35 provided on the rear moving ring 3. At this time, the coil spring 5 located between the front moving ring 2 and the rear lens barrel submodule 4 constantly generates the spring force in the mutually opposite directions along the direction of the optical axis, and the bent portion 55 is housed in the spring housing 7 while biasing the rear lens barrel submodule 4. In the meantime, a length of the bent, portion 55 is sufficiently larger than a difference between a radius of an outside diameter portion 45 of the rear lens barrel submodule 4 and a radius of an inside diameter portion 36 of the rear moving ring 3. Due to the above-described configuration, the bent portion 55 does not come off the spring housing 7 in the state where the rear lens barrel submodule 4 is attached. Accordingly, it is possible to prevent the end face of the coil spring 5 from coming off the rear moving-part group 9 without bonding the coil spring 5 to the rear moving ring 3 and the rear lens barrel submodule 4.

The bent portion 55 is configured. to be kept from coming off as a consequence of attaching the rear lens barrel submodule 4 to the rear moving ring 3, the rear lens barrel submodule 4 being provided separately from the rear moving ring 3 that fixes the cam follower 32b. For this reason, when the lens barrel 1 of the present invention is assembled, the rear moving ring 3 can easily fix (assemble) the cam follower 32b without the rear lens barrel submodule 4 or the coil spring 5, or without receiving the spring force.

Although the recess 35 is provided at part of the attach surface of the rear moving ring 3 to be attached to the rear lens barrel submodule 4 in this embodiment, the recess 35 only needs to be formed at part of one of the attach surfaces used to fix the rear lens barrel submodule 4 and the rear moving ring 3 to each other. The latter configuration can also define the clearance extending in the direction of the optical axis with the other attach surface, thereby achieving the effect of the present invention.

In this embodiment, the coil spring 5 being the elastic member compressed between the two adjacent moving-part groups and configured to bias the two moving-part groups in the directions to recede from each other. However, the present invention is not limited only to this configuration, and the coil spring 5 may be configured to bias the two adjacent moving-part groups in directions to approach each other. In the latter case, the bent portion 55 of the coil spring 5 biases the rear moving ring 3 in such a direction to approach its adjacent moving-part group.

Meanwhile, in this embodiment, the cam followers of the front moving ring and of the rear moving ring are brought into slidable contact with the same straight groove portion on the base ring. However, the present invention is not limited to this configuration. The base ring may be provided with a straight groove portion for the front moving ring and a straight groove portion for the rear moving ring separately from each other, and the cam followers of the moving rings may be configured to come into slidable contact with the corresponding straight groove portions, respectively.

Second Embodiment

Figure 7:
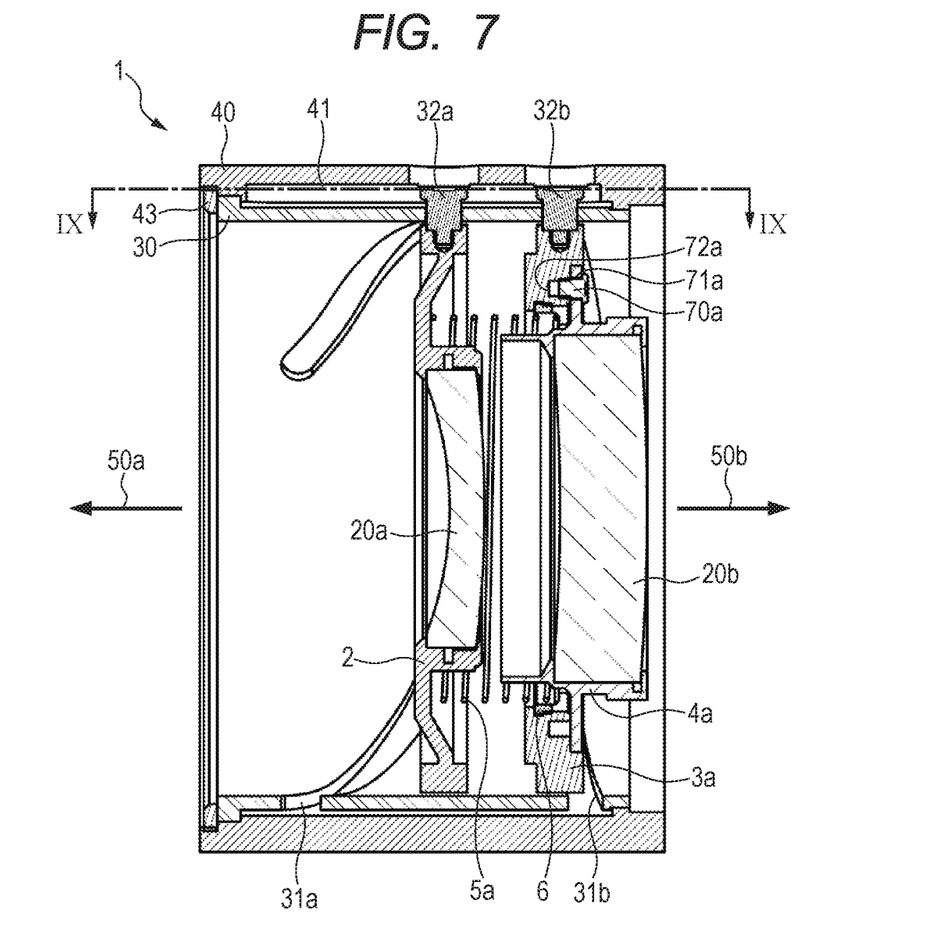
FIG. 7 is a partial cross-sectional view of a lens barrel of a second embodiment.
Figure 8:
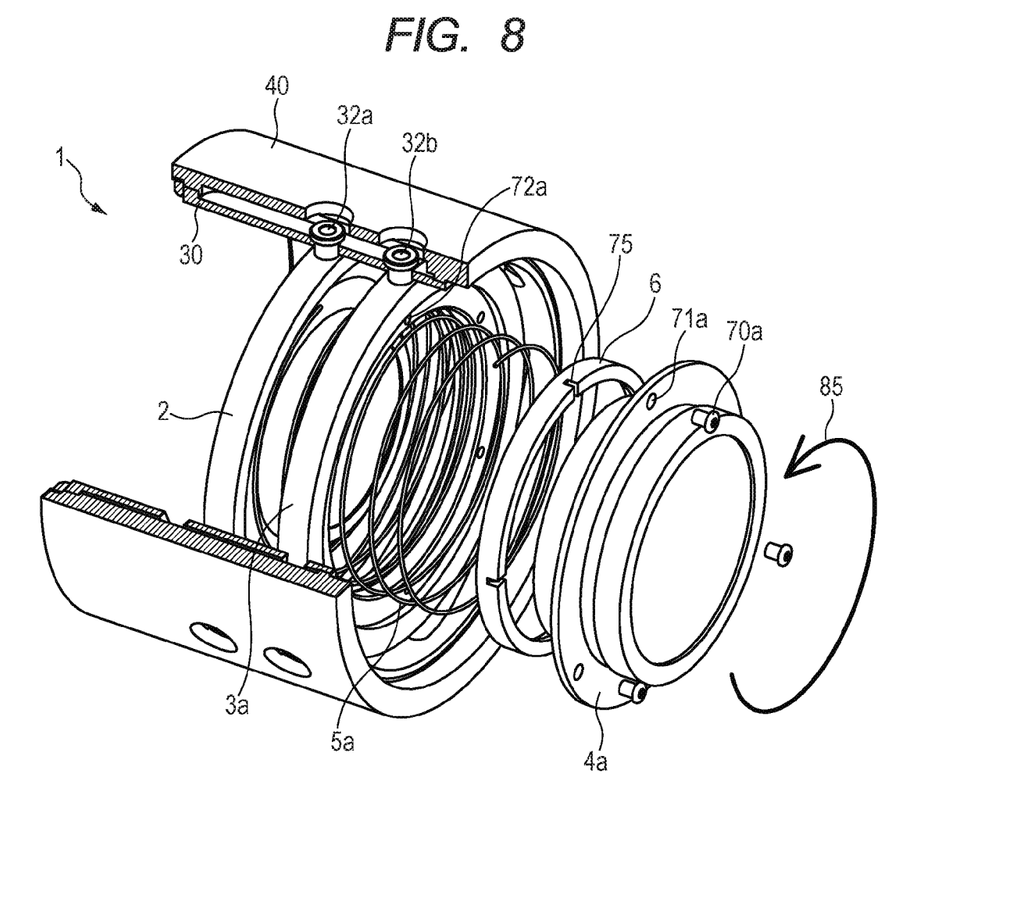
FIG. 8 is a partially cutaway perspective view of the lens barrel of the second embodiment.
Figure 9:
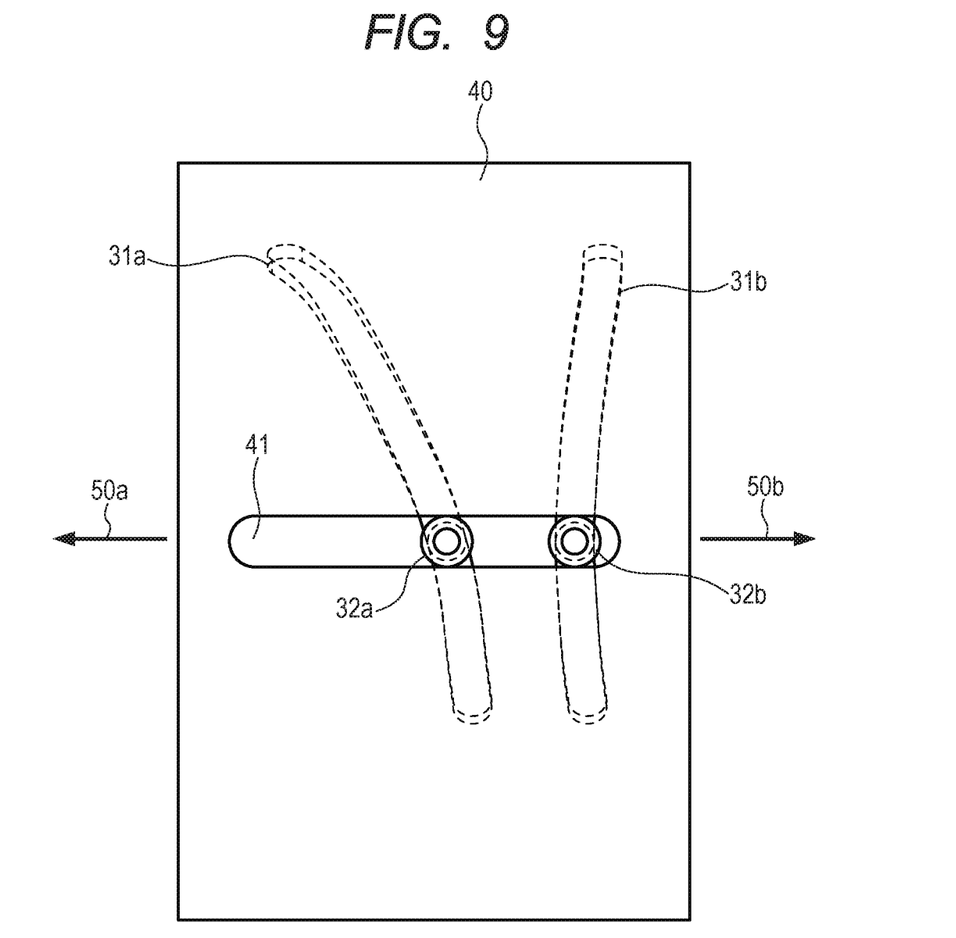
FIG. 9 is a cross-sectional view of the lens barrel of the second embodiment, which is taken along the IX-IX line in FIG. 7.

FIG. 7 is a partial cross-sectional view of a lens barrel 1 of this embodiment. FIG. 8 shows a partially cutaway perspective view of the lens barrel 1 in FIG. 7, and FIG. 9 shows a cross-sectional view of the lens barrel 1 taken along the IX-IX line in FIG. 7.

A cam structure of the lens barrel 1 will be described with reference to FIG. 7.

The lens barrel 1 includes a lens barrel submodule, optical systems, and a drive system which drives some of the optical systems. The drive system of this embodiment employs a so-called cam mechanism in order to move the optical systems in directions of an optical axis, and thus to adjust an optical performance of the lens barrel 1. A front optical system 20a is fixed to a front moving ring 2 with a lens holding structure obtained by using a press ring or by calking. A rear optical system 20b is fixed to a rear lens barrel submodule 4a (the lens barrel submodule) with a similar lens holding structure. Moreover, the rear lens barrel submodule 4a includes a screw insertion hole 71a into which a fixation screw 70a is inserted. The rear lens barrel submodule 4a is configured to be detachably fixed to a rear moving ring 3a (a moving lens barrel) by threadedly engaging the fixation screw 70a with a tapped hole 72a in the rear moving ring 3a. A cam follower 32a is fixed to the front moving ring 2, and another cam follower 32b is fixed to the rear moving ring 3a. The cam follower 32a comes into slidable contact with a cam groove 31a provided on a rotating cam ring (a cam member) 30, and with a straight groove portion 41 located on a base ring 40 and extending in the direction of the optical axis. The cam follower 32b comes into slidable contact with a cam groove 31b provided on the cam ring 30, and with the straight groove portion 41 located on the base ring 40. Here, attitudes of the front moving ring 2 and the rear moving ring 3a are retained by locating the cam followers 32a and 32b, the cam grooves 31a and 31b, and the straight groove portion 41 at three positions that are substantially equally divided around the optical axis. The cam ring 30 is held at an inside diameter portion of the base ring 40 and in a state of being rotatable around the optical axis by using a cam press member 43. When the cam ring 30 is rotated, the cam followers 32a and 32b are moved in directions 50a and 50b of the optical axis along the cam grooves 31a and 31b. As a consequence, an optical performance of the lens barrel 1 varies with a change in interval between the front optical system 20a and the rear optical system 20b.

While there is backlash between the cam follower 32a or 32b and the corresponding cam groove 31a or 31b, which depends on part accuracy, this backlash needs to be suppressed in order to reduce an adverse effect on the optical performance. Now, a backlash suppression structure for the cam followers will be described below with reference to FIGS. 7 to 9. The lens barrel 1 includes a coil spring 5a being an elastic member, which is located between the front moving ring 2 and a spring press ring (a fixed member) 6. The coil spring 5a generates a spring force between the front moving ring 2 and the spring press ring 6. The force acts on the front moving ring 2 and the spring press ring 6 as a force to bias the front moving ring 2 and the spring press ring 6 in mutually opposite directions (receding directions) along the direction of the optical axis. An outside diameter portion of the spring press ring 6 is provided with threads, and is fixed to the rear moving ring 3a by means of threaded engagement with a threaded portion on an inside diameter portion of the rear moving ring 3a. As a consequence, the force acting on the front moving ring 2 and the spring press ring 6 acts in the direction 50a of the optical axis on the cam follower 32a and in the direction 50b of the optical axis on the cam follower 32b, thereby suppressing the backlash between the cam follower 32a or 32b and the corresponding cam groove 31a or 31b. Here, a rotational direction 85 of threaded engagement by rotation to threadedly engage the spring press ring 6 with the rear moving ring 3a is opposite to a winding direction of the coil spring 5a. For this reason, no load is applied to the coil spring 5a at the time of rotating and fixing the spring press ring 6, and deformation of the coil spring 5a is thus suppressed. In the meantime, the spring press ring 6 is provided with slots 75 to be engaged with a tool used for rotation. A portion of an end of the coil spring 5a is seen through each slot 75 including a portion that penetrates in the direction of the optical axis. Accordingly, after the spring press ring 6 is fixed to the rear moving ring 3a, an adhesive is applied (injected) through the slots 15 and the coil spring 5a and the spring press ring 6 are bonded and fixed to each other in this way, a worker can visually check a working condition through the slots 75. Here, regarding the coil spring 5a and the front moving ring 2, it is possible to bond an end face of the spring to the front moving ring 2. Accordingly, in this embodiment, the spring press ring 6 constitutes an edge regulating mechanism that regulates positional freedom of the end of the coil spring 5a.

As described above, according to this embodiment, the end of the coil spring 5a is not fixed directly to the rear moving ring 3a that fixes the cam follower. As a consequence, the coil spring 5a is not affected by the spring force at the time of fixed of the cam follower. Moreover, since the end of the coil spring 5a is fixed to the spring press ring 6, it is possible to attach and. detach the rear lens barrel submodule 4a without breaking the bond to the spring. While the spring press ring 6 is retained by the rear moving ring 3a through the threads on the outside diameter portion, such a retention structure is not limited to the thread mechanism as long as the spring press ring 6 is provided with a surface to receive the force of the coil spring 5a, which acts in a particular direction (the direction 50b of the optical axis) on the spring press ring 6.

Third Embodiment

Figure 10:
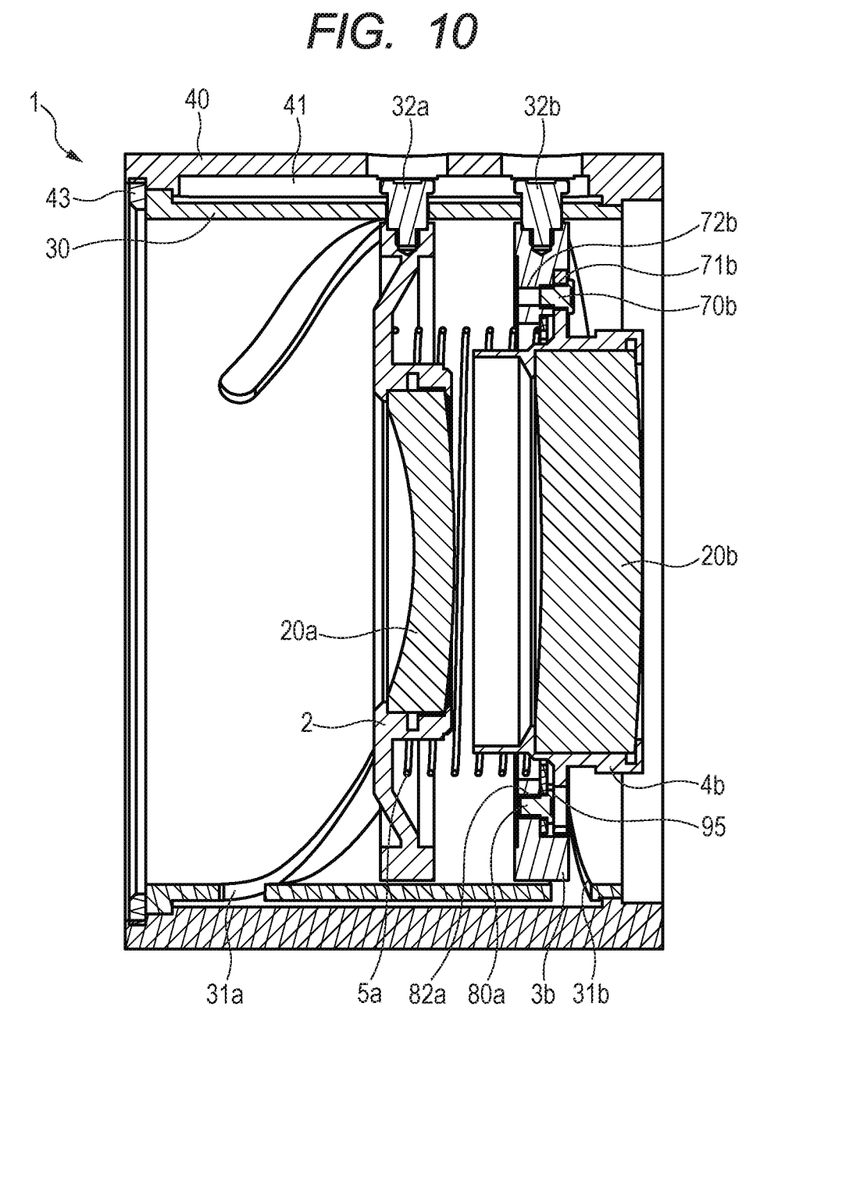
FIG. 10 is a partial cross-sectional view of a lens barrel of a third embodiment.
Figure 11:
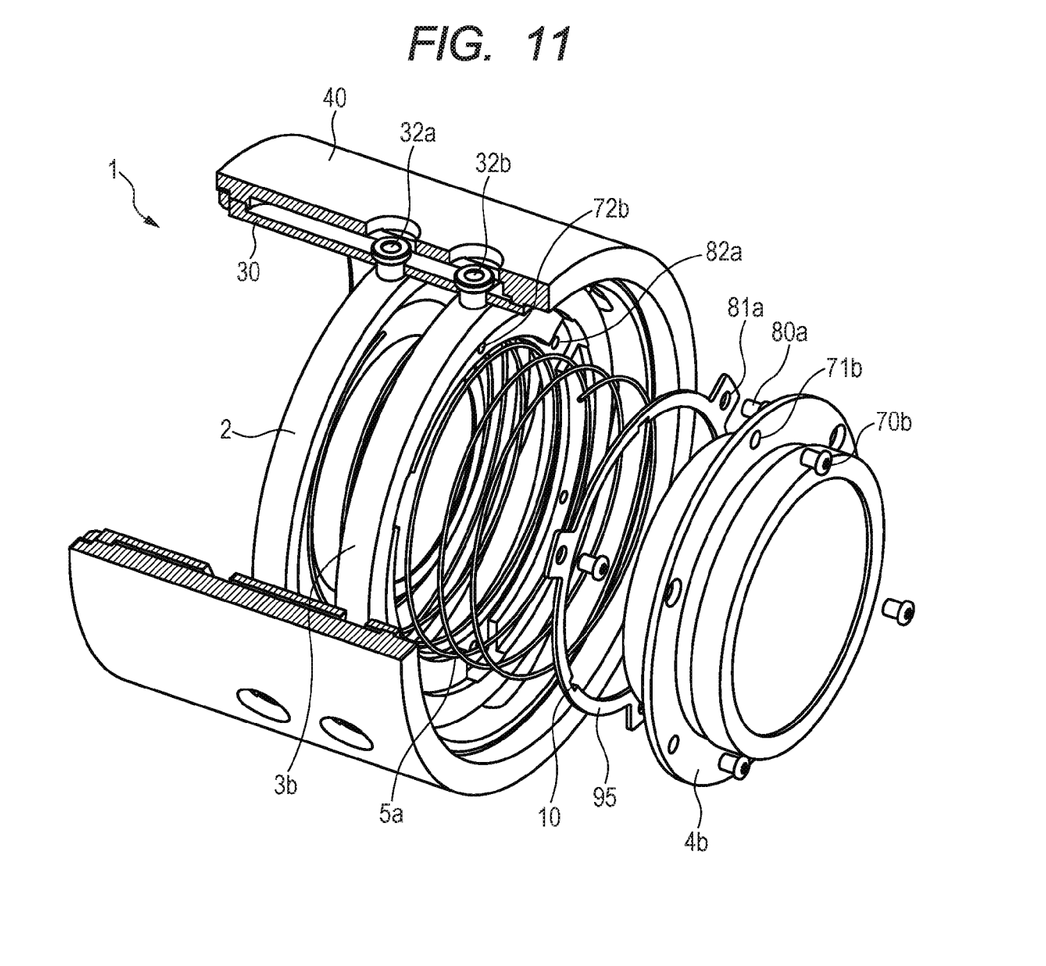
FIG. 11 is a partially cutaway perspective view of the lens barrel of the third embodiment.

In FIGS. 10 and 11, the rear moving ring 3a shown in FIGS. 7 and 8 is replaced with a rear moving ring 3b, and the rear lens barrel submodule 4a shown therein is replaced with a rear lens barrel submodule 4b, respectively. The rear lens barrel submodule 4b includes a screw insertion hole 71b into which a fixation screw 70b is inserted. The rear lens barrel submodule 4b is configured to be detachably fixed to the rear moving ring 3b (a moving lens barrel) by threadedly engaging the fixation screw 70b with a tapped hole 72b in the rear moving ring 3b.

Unlike the second embodiment, an end of the coil spring 5a is bonded and fixed to a Spring press plate (a fixed member) 95 in this embodiment. The spring press plate 95 includes a screw insertion hole 81a into which a fixation screw 80a is Inserted. Thus, the spring press plate 95 is fixed to the rear moving ring 3b by means of the fixation screw 80a. The spring press plate 95 is provided with slits 10 which penetrate the spring press plate 95 in the direction of the optical axis. A portion of an end of the coil spring 5a is seen through the slits 10. Accordingly, the coil spring 5a and the spring press plate 95 can be bonded to each other by applying an adhesive through the slits 10. For this reason, bonded positions between the spring press plate 95 and the coil spring 5a are located at the slits 10. This is a structure that allows the worker to visually check a bonding condition easily. Accordingly, in this embodiment, the spring press plate and the fixation screw 80a collectively constitute an edge regulating mechanism that regulates positional freedom of the end of the coil spring 5a.

As described above, according to this embodiment, the end of the coil spring 5a is not fixed directly to the rear moving ring 3b that fixes the cam follower. As a consequence, the coil spring 5a is not affected by the spring force at the time of fixation of the cam follower. Moreover, since the end of the coil spring 5a is fixed to the spring press plate 95, it is possible to attach and detach the rear lens barrel submodule 4b without breaking the bond to the spring.

Fourth Embodiment

Figure 12:
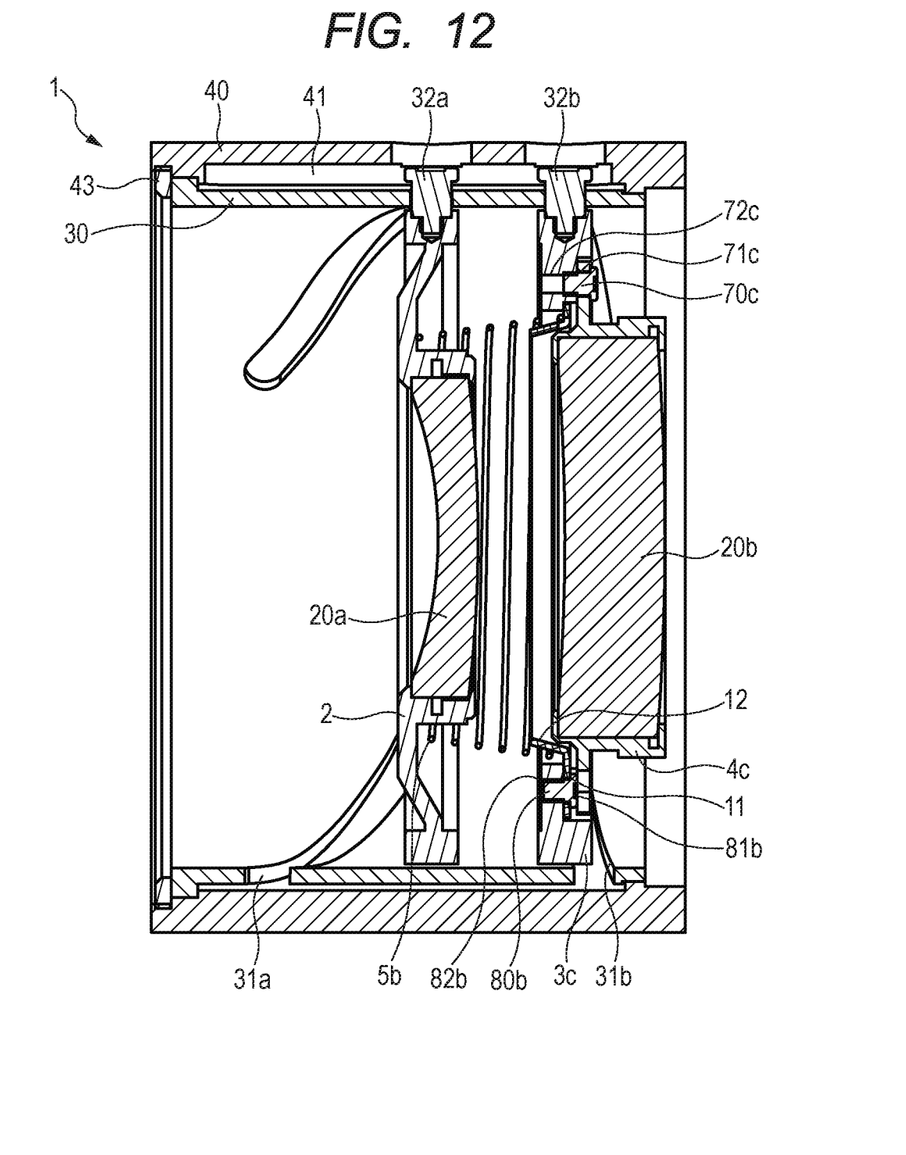
FIG. 12 is a partial cross-sectional view of a lens barrel of a fourth embodiment.

In FIG. 12, the rear moving ring 3b shown in FIG. 10 is replaced with a rear moving ring 3c, the rear lens barrel submodule 4b shown therein is replaced with a rear lens barrel submodule 4c, and the coil spring 5a shown therein is replaced with a coil spring 5b, respectively. The rear lens barrel submodule 4c includes a screw insertion hole 71c into which a fixation screw 70c is inserted. The rear lens barrel submodule 4c is configured to be detachably fixed to the rear moving ring 3c (a moving lens barrel) by threadedly engaging the fixation screw 70c with a tapped hole 12c in the rear moving ring 3c.

Unlike the third embodiment, the coil spring 5b is a conical coil spring of which a winding diameter is gradually increased toward the rear moving ring 3c. An end of the coil spring 5b is bonded and fixed to a spring press member (a fixed member) 11. The spring press member 11 includes a screw insertion hole 81b into which a fixation screw 80b is inserted. Thus, the spring press member 11 is fixed to the rear moving ring 3c by means of the fixation screw 80b. The spring press member 11 is provided with a coil spring light blocking part (a skirt part) 12, which extends along an inside diameter of the coil spring 5b such that unnecessary light beams do not reach the coil spring 5b. As described above, the spring press member 11 is provided as a spring receiver that is not integrated with the rear moving ring 3c or the rear lens barrel submodule 4c. In this way, the spring receiver has more freedom to deal with a complex shape in such a way as to follow the conical shape of the coil spring 5b. Thus, according to this embodiment, the spring press member 11 and the fixation screw 80b collectively constitute an edge regulating mechanism that regulates positional freedom of the end of the coil spring 5b.

As described above, according to this embodiment, the end of the coil spring 5b is not fixed directly to the rear moving ring 3c that fixes the cam follower. As a consequence, the coil spring 5b is not affected by the spring force at the time of fixation of the cam follower. Moreover, since the end of the coil spring 5b is fixed to the spring press member 11, it is possible to attach and detach the rear lens barrel submodule 4c without breaking the bond to the spring.

Although certain preferred embodiments of the present invention have been described above, it is to be understood that the present invention is not limited to these embodiments and various modifications and alterations are possible within the range of the gist of the invention.

In addition, a lens apparatus and an image pickup apparatus having the effect of the present invention can be fabricated by providing a lens apparatus including the lens barrel of the present invention and an image pickup apparatus including the lens apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-057164, filed Mar. 22, 2016, which is hereby incorporated by reference herein in its entirety.

What is claimed is:

1. A barrel apparatus comprising:
   a base barrel in which a straight groove, extending in a direction of an optical axis, is formed;
   a cam member being rotatable around the optical axis relative to the base barrel, in which a first cam groove and a second cam groove are formed;
   an optical element barrel holding a first optical element;
   a first moving barrel including a first cam follower in contact with the straight groove and the first cam groove;
   a second moving barrel holding a second optical element, and including a second cam follower in contact with the straight groove and the second cam groove;
   an elastic member disposed between the first moving lens barrel and the second moving barrel and biasing the first moving barrel and the second moving barrel in mutually opposite directions along the optical axis in a state where the optical element barrel is detachably attached to the first moving barrel; and
   a fixing member attached to the first moving barrel detachably from the first moving barrel, and fixing an end of the elastic member.

2. The barrel apparatus according to claim 1, wherein the fixing member is detachably attached to the first moving barrel in a state where the first moving barrel is disposed between the fixing member and the second moving barrel in the direction of the optical axis, and the optical element barrel is detachably attached to the first moving barrel in a state where the fixing member is disposed between the first moving barrel and the optical element barrel in the direction of the optical axis.

3. The barrel apparatus according to claim 1, wherein the elastic member includes a coil spring.

4. The barrel apparatus according to claim 1, wherein the fixing member screwed with the first moving barrel to be attached to the first moving lens barrel.

5. The barrel apparatus according to claim 1, wherein the elastic member includes a coil spring, and the fixing member is screwed with the first moving barrel by being rotated in a direction opposite to a winding direction of the coil spring.

6. The barrel apparatus according to claim 1, wherein a notch is formed through the fixing member in the direction of the optical axis.

7. The barrel apparatus according to claim 1, wherein the fixing member includes a skirt part which extends to a space between at least a part of the elastic member and the optical axis.

8. A lens apparatus comprising the barrel apparatus according to claim 1.

9. An image pickup apparatus comprising the lens apparatus according to claim 8.

10. A barrel apparatus comprising:
a base barrel in which a straight groove, extending in a direction of an optical axis, is formed;
a cam member being rotatable around the optical axis relative to the base barrel, in which a first cam groove and a second cam groove are formed;
an optical element barrel holding a first optical element;
a first moving barrel including a first cam follower in contact with the straight groove and the first cam groove;
a second moving barrel holding a second optical element, and including a second cam follower in contact with the straight groove and the second cam groove; and
an elastic member disposed between the first moving barrel and the second moving barrel and biasing the first moving barrel and the second moving barrel in mutually opposite directions along the optical axis in a state where the optical element barrel is detachably attached to the first moving barrel,
wherein the elastic member includes a coil spring which includes a bent portion as an end, of the coil spring, bent toward a radial direction,
wherein a concave portion, which is concave in the direction of the optical axis, is formed in at least one of the first moving barrel and the optical element barrel to house at least a part of the bent portion,
wherein the at least a part of the bent portion is housed in a clearance formed between the first moving barrel and the optical element barrel in the direction of the optical axis with the concave portion in a state where the optical element barrel is attached to the first moving barrel so that a position of the at least a part of the bent portion is regulated in the direction of the optical axis by the first moving barrel and the optical element barrel.

11. A lens apparatus comprising the barrel apparatus according to claim 10.

12. An image pickup apparatus comprising the lens apparatus according to claim 11.

* * * * *